United States Patent
Kini et al.

(10) Patent No.: US 8,885,461 B2
(45) Date of Patent: Nov. 11, 2014

(54) MPLS FAST RE-ROUTE USING LDP (LDP-FRR)

(75) Inventors: Sriganesh Kini, Fremont, CA (US); Srikanth Narayanan, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 374 days.

(21) Appl. No.: 13/281,391

(22) Filed: Oct. 25, 2011

(65) Prior Publication Data

US 2013/0010589 A1    Jan. 10, 2013

Related U.S. Application Data (60) Provisional application No. 61/505,052, filed on Jul. 6, 2011.

(51) Int. Cl.
| | |
|---|---|
| *H04L 12/26* | (2006.01) |
| *H04L 12/723* | (2013.01) |
| *H04L 12/707* | (2013.01) |
| *H04L 12/703* | (2013.01) |

(52) U.S. Cl.
CPC ............... *H04L 45/50* (2013.01); *H04L 45/22* (2013.01); *H04L 45/28* (2013.01)
USPC ......................................................... 370/228

(58) Field of Classification Search
CPC ....................................................... H04L 45/28
USPC ........................................................ 370/219
See application file for complete search history.

(56) References Cited

U.S. PATENT DOCUMENTS

| 7,929,557 | B2 * | 4/2011 | Kompella | 370/401 |
|---|---|---|---|---|
| 7,969,898 | B1 * | 6/2011 | Raj et al. | 370/248 |
| 8,259,564 | B1 * | 9/2012 | Gredler et al. | 370/227 |
| 2005/0111351 | A1 * | 5/2005 | Shen | 370/217 |
| 2007/0036072 | A1 * | 2/2007 | Raj et al. | 370/225 |
| 2007/0174483 | A1 * | 7/2007 | Raj et al. | 709/238 |
| 2009/0323521 | A1 * | 12/2009 | Tochio | 370/225 |
| 2010/0315943 | A1 * | 12/2010 | Chao et al. | 370/221 |
| 2011/0007629 | A1 * | 1/2011 | Atlas et al. | 370/225 |
| 2012/0243407 | A1 * | 9/2012 | Li et al. | 370/228 |

OTHER PUBLICATIONS

Pan P. et al., "Fast Reroute Extensions to RSVP-TE for LSP Tunnels", Network Working Group, RFC 4090, (May 1, 2005), 36 pages.

(Continued)

*Primary Examiner* — Mark Rinehart
*Assistant Examiner* — Christopher R Crompton
(74) *Attorney, Agent, or Firm* — Blakely Sokoloff Taylor & Zafman (57) ABSTRACT

A first network element in an MPLS network receives a first label advertised from a second network element in the network. The first network element computes a shortest path tree (SPT) to reach a destination network element under a potential failure condition. The second network element is a nexthop of the first network element in the computed SPT and is not upstream from the potential failure condition in the computed SPT. The first network element determines that a third network element in the network is a Point of Local Repair (PLR) when the potential failure condition is realized. The first network element distributes a second label to the third network element for a backup LDP Label Switched Path (LSP) that will serve as a backup path when the potential failure condition is realized. The first network element installs a swap action from the second label to the first label.

20 Claims, 8 Drawing Sheets (56) References Cited

OTHER PUBLICATIONS

IETF Draft Submission: Dimitry Haskin, Ram Krishnan, Axiowave Networks Status: A Method for Setting an Alternative Label Switched Paths to Handle Fast Reroute; draft-haskin-mpls-fast-reroute-05.txt, 2001101, No. 5, Nov. 1, 2000 (http://tools.ietf.org/html/draft-haskin-mpls-fast-reroute-05) 11 pages.
J. Moy, OSPF Version 2, Network Working Group, Request for Comments: 2328, Apr. 1998, 245 pages.
E. Rosen et al., Multiprotocol Label Switching Architecture, Network Working Group, Request for Comments: 3031, Jan. 2001, 62 pages.
E. Rosen et al., MPLS Label Stack Encoding, Network Working Group, Request for Comments: 3032, Jan. 2001, 24 pages.
P. Pan et al., Fast Reroute Extensions to RSVP-TE for LSP Tunnels, Network Working Group, Request for Comments: 4090, May 2005, 39 pages.
K. Kompella et al., Routing Extensions in Support of Generalized Multi-Protocol Label Switching (GMPLS), Network Working Group, Request for Comments: 4202, Oct. 2005, 28 pages.
L. Andersson et al., LDP Specification, Network Working Group, Request for Comments: 5036. Oct. 2007, 136 pages.
A. Atlas et al., Basic Specification for IP Fast Reroute: Loop-Free Alternates, Network Working Group, Sep. 2008, 32 pages.
M. Shand et al., IP Fast Reroute Framework, Internet Engineering Task Force (IETF), Request for Comments: 5714, Jan. 2010, 16 pages.
S. Kini et al., MPLS Fast Re-route using extensions to LDP, draft-kini-mpls-frr-ldp-01, IETF 81 Quebec City, Jul. 24-29, 2011, 16 pages.
S. Kini et al., MPLS Fast Re-route using extensions to LDP, draft-kini-mpls-frr-ldp-00, IETF 80 Prague, Mar. 27-Apr. 1, 2011, 15 pages.
S. Kini et al., MPLS Fast Re-route using extensions to LDP, draft-kini-mpls-frr-ldp-01, IETF 81 Quebec City, Jul. 24-29, 2011, 14 pages.
S. Kini et al., MPLS Fast Reroute using extensions to LDP draft-kini-mpls-frr-ldp-00.txt, MPLS Working Group, Internet Draft, Mar. 7, 2011, 6 pages.
S. Kini et al., MPLS Fast Re-route using extensions to LDP draft-kini-mpls-frr-ldp-01.txt, MPLS Working Group, Internet Draft, Jul. 11, 2011, 11 pages.
Non-Final Office Action, U.S. Appl. No. 13/113,007, dated Jun. 11, 2013, 19 pages.
Final Office Action, U.S. Appl. No. 13/113,007, dated Oct. 22, 2013, 9 pages.

* cited by examiner

```
                    FAILURE ELEMENT TLV 710
  0                   1              2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |0|0| Failure Element (0xTBD)   |          Length               |
 +-+-+-+-+-+-+-+-+-+-+-+-+-+-+-+-+-+-+-+-+-+-+-+-+-+-+-+-+-+-+-+-+
 |                    Failure Element Type                       |  715
 +-+-+-+-+-+-+-+-+-+-+-+-+-+-+-+-+-+-+-+-+-+-+-+-+-+-+-+-+-+-+-+-+
 |                  Failure Element Identifier                   |
 .                                                               .  720
 +-+-+-+-+-+-+-+-+-+-+-+-+-+-+-+-+-+-+-+-+-+-+-+-+-+-+-+-+-+-+-+-+
```

FIG. 7

```
                    BACKUP PATH VECTOR TLV 810
  0                   1               2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |0|0| Backup Path Vector (0xTBD)|          Length               |
 +-+-+-+-+-+-+-+-+-+-+-+-+-+-+-+-+-+-+-+-+-+-+-+-+-+-+-+-+-+-+-+-+
 | Address Family                |                               |
 +-+-+-+-+-+-+-+-+-+-+-+-+-+-+-+-+                               |
 |                     Address                                   |
 .                                                               .
 +-+-+-+-+-+-+-+-+-+-+-+-+-+-+-+-+-+-+-+-+-+-+-+-+-+-+-+-+-+-+-+-+
 .                                                               .
 .                                                               .
 +-+-+-+-+-+-+-+-+-+-+-+-+-+-+-+-+-+-+-+-+-+-+-+-+-+-+-+-+-+-+-+-+
 | Address Family                |                               |
 +-+-+-+-+-+-+-+-+-+-+-+-+-+-+-+-+                               |
 |                     Address                                   |
 .                                                               .
 +-+-+-+-+-+-+-+-+-+-+-+-+-+-+-+-+-+-+-+-+-+-+-+-+-+-+-+-+-+-+-+-+
```

FIG. 8

```
                    TUNNELED FEC TLV 910
  0                   1               2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |0|0| Tunneled Prefix (0xTBD)   |          Length               |
 +-+-+-+-+-+-+-+-+-+-+-+-+-+-+-+-+-+-+-+-+-+-+-+-+-+-+-+-+-+-+-+-+
```

MPLS FAST RE-ROUTE USING LDP (LDP-FRR)

CROSS-REFERENCE TO RELATED APPLICATIONS

This application claims the benefit of U.S. Provisional Application No. 61/505,052 filed Jul. 6, 2011, which is hereby incorporated by reference.

FIELD

Embodiments of the invention relate to the field of networking; and more specifically, to MPLS (MultiProtocol Label Switching) Fast-Reroute.

BACKGROUND

Recovering traffic with minimal loss is a fundamental requirement in carrier-class networks. Fast-Reroute (FRR) is a technique to recover traffic with minimal loss under failure conditions in a network.

LDP (Label Distribution Protocol), defined in RFC 5036, is a widely deployed protocol to setup Label Switched Paths (LSPs) in MPLS (MultiProtocol Label Switching) (defined in RFCs 3031 and 3032) implementations. LDP establishes LSPs along routed paths setup by IGP (Interior Gateway Protocol) (defined, for example, in RFC 2328). Thus, the convergence of LSPs established with LDP under failure conditions is gated by IGP convergence.

RSVP-TE (Resource Reservation Protocol—Traffic Engineering) based FRR has been standardized (RFC 4090) and implemented in several vendors platforms. Some operators and vendors have tried to address the fast-convergence of LDP by using RSVP-TE. This feature is typically referred to as LDP-over-RSVP.

Since LDP follows routed paths setup by IGP, its convergence is gated by IGP convergence. However IGP convergence has been traditionally slow. A good description of the problem is in section 4 of RFC 5714. For example, such reasons include: the time taken to detect the failure, the amount of time for the local router to react the failure, the amount of time to transmit the information about the failure to other routers in the network, the amount of time to re-compute the forwarding tables, and the amount of time to download the re-computed forwarding tables into the forwarding hardware. Several approaches have tried to introduce FRR in IGP to improve IGP convergence, but each of them have been plagued by several problems. For example, approaches to solving this problem such as draft-ietf-rtgwg-ipfrr-notvia-addresses-OX has deployment and implementation complexity and hence has not been adopted. Approaches such as Loop Free Alternates (described in RFC 5286) do not have full coverage, hence carriers have reservations in deploying them.

Another approach to providing FRR for LDP LSPs is to use RSVP-TE as a failure-bypass mechanism (LDP-over-RSVP). However, carriers have been slow to deploy RSVP-TE due to several reasons, including the extensive configuration and maintenance experience requirements since an additional, fairly complex protocol such as RSVP-TE is used, leading to increased operating expenses. LDP-over-RSVP also requires the vendor to support many features (such as high availability and reliability) in RSVP-TE that may not be available in many implementations.

BRIEF DESCRIPTION OF THE DRAWINGS

The invention may best be understood by referring to the following description and accompanying drawings that are used to illustrate embodiments of the invention. In the drawings.

SUMMARY

MPLS (Multiprotocol Label Switching) fast re-routing using LDP (Label Distribution Protocol) is described. An LDP LSP (Label Switched Path) to reach a destination network under a potential failure condition is computed. That computed LDP LSP is merged with a current shortest path LDP LSP at that one of the plurality of network elements that is the first network element along the computed LDP LSP that has a nexthop to the current shortest path LDP LSP.

In one embodiment, a backup shortest path (BSP) LSP is created from the Point of Local Repair (PLR) to a BSP Merge Point (MP) to re-route traffic around a potential failure. When the failure occurs, the PLR switches traffic from the shortest path (SP) LSP to the BSP LSP. The PLR uses label stacking to switch the traffic to the BSP-MP along the SP LSP from the PLR to the BSP-MP. The BSP-MP label switches traffic from the BSP LSP to the SP LSP (that does not go through the failure) thus restoring the traffic. Since all the nodes along the path from the BSP-MP to the PLR have state for the BSP LSP, additional state is not required. This process is performed for multiple failure points throughout the network (e.g., this process is performed for all potential failure conditions in the network).

In one embodiment, a first network element in an MPLS network receives a first label advertised from a second network element in the MPLS network. The first network element computes a shortest path tree (SPT) to reach a destination network element under a potential failure condition. The second network element is a nexthop of the first network element in the computed SPT and is not upstream from the potential failure condition in the computed SPT. The first network element determines that a third network element in the MPLS network is a PLR when the potential failure condition is realized. The first network element distributes a second label to the third network element for a backup LDP LSP that will serve as a backup path when the potential failure condition is realized. The first network element installs a swap action from the second label to the first label. In one embodiment, the backup LDP LSP is an existing shortest path LSP from the third network element to the first network element.

In one embodiment, a first network element in an MPLS network computes a SPT to reach a destination network element under a potential failure condition. The first network element configures its forwarding state such that when the potential failure condition is realized, packets that are subsequently received at the first network element that are destined for the destination network element are re-routed towards a second network element using an existing LSP with an indication to the second network element to merge the existing LSP with a shortest path LDP LSP from the second network element to the destination network element. The second network element is an upstream network element on the computed SPT that has a nexthop on the shortest path LDP LSP to the destination network element.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In one embodiment, fast-reroute for LDP LSPs is provided without depending on IGP fast-convergence, IP-FRR, or RSVP-TE based FRR. Since LDP has very simple and easy configuration procedures that has led to its current wide adoption, an implementation that adopts embodiments of the invention can retain the simple configuration model. In most circumstances a carrier will not have to change any operational procedures to an implementation of embodiments of this invention. Thus, embodiments of the invention retain the simplicity of operating LDP and overcomes the complexity of IP-FRR and LDP-over-RSVP while providing coverage in all fault scenarios.

The following terminology is used to describe embodiments of the invention. A PLR (Point of Local Repair) is the head-end LSR (Label Switch Router) of a backup-switched path (BSP) LSP. The PLR is the node that detects a failure and repairs the failure of the link or node by sending traffic on an alternate route (the BSP LSP). The BSP LSP is an LDP LSP that provides a backup for a specific failure entity on the shortest path LDP LSP. The failure entity may be a link, a node, or a SRLG. The BSP LSP originates from the PLR(s). A Backup Shortest Path Merge Point (BSP-MP) is an LSR where the BSP LSP is label switched to a label allocated for the shortest path LDP LSP. The BSP-MP need not be downstream of the potential failure. An exclude-SPT (Shortest Path Tree) is the shortest path tree from a PLR to a FEC (Forwarding Equivalence Class) when a particular failure point is excluded from the network.

In one embodiment, the BSP LSP is created from the PLR to the BSP-MP to re-route traffic around a potential failure. When the failure occurs, the PLR switches traffic from the shortest path (SP) LSP to the BSP LSP. The PLR uses label stacking to switch the traffic to the BSP-MP along the SP LSP from the PLR to the BSP-MP. The BSP-MP label switches traffic from the BSP LSP to the SP LSP (that does not go through the failure) thus restoring the traffic. Since all the nodes along the path from the BSP-MP to the PLR have state for the BSP LSP, additional state is not required. This process is performed for multiple failure points throughout the network (e.g., this process is performed for all potential failure conditions in the network).

Figure 1:
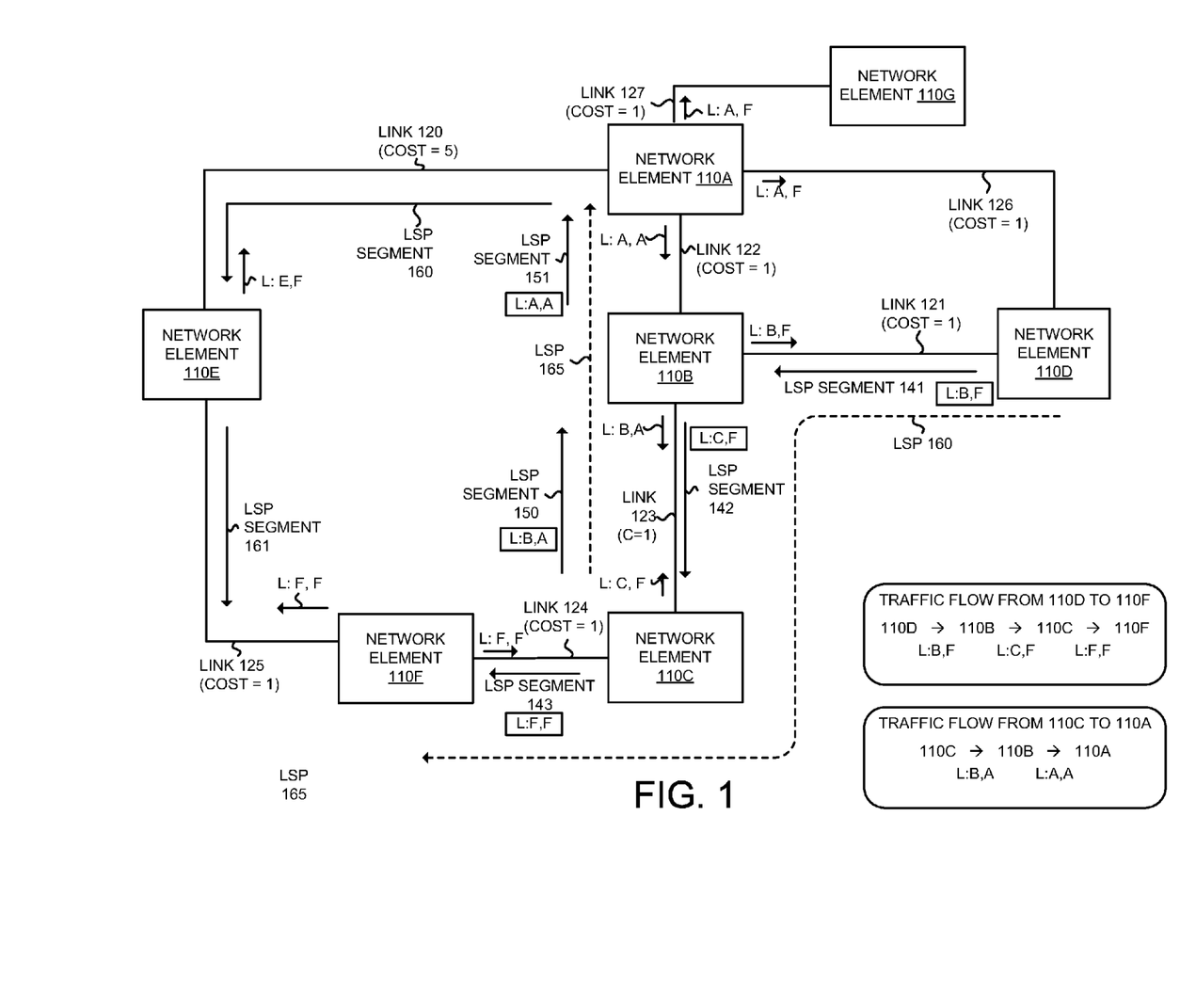
FIG. 1 illustrates an exemplary MPLS network that uses LDP-FRR with reuse of shortest path LSPs according to one embodiment.

FIG. 1 illustrates an exemplary MPLS network that uses LDP-FRR with reuse of shortest path (SP) LSPs according to one embodiment. The network illustrated in FIG. 1 includes the network elements 110A-G. Each of the network elements acts as a LSR. The network element 110A is coupled with the network elements 110B, 110D, 110E, and 110G over the links 122, 126, 120, and 127 respectively. The network element 110B is further coupled with the network element 110C over the link 123 and coupled with the network element 110D over the link 121. The network element 110C is further coupled with the network element 110F over the link 124. The network element 110F is further coupled with the network elements 110E over the link 125. The links 121, 122, 123, 124, 125, 126, and 127 each have a cost of 1. The link 120 has a cost of 5.

FIG. 1 also illustrates a number of LSP segments that have been established between the network elements (it should be understood, however, that FIG. 1 does not illustrate each LSP segment that may be established). In one embodiment, the LSP segments have been established using LDP. For example, For example, the label L:B,F is allocated by the network element 110B for the prefix F and is used by the network element 110D when sending traffic destined for the prefix F (on the network element 110F) on the LSP segment 141 between the network element 110D and 110B. The network element 110C allocates the label L:C,F for the prefix F to be used by the network element 110B when sending traffic destined for the prefix F on the LSP segment 142 between the network element 110B and 110C. The network element 110F allocates the label L:F,F for the prefix F to be used by the network element 110C when sending traffic destined for the prefix F on the LSP segment 143 between the network element 110F and 110C. Similarly, the network element 110F allocates the label L:F,F for the prefix F to be used by the network element 110E when sending traffic destined for the prefix F on the LSP segment 161 between the network element 110E and the network element 110F. The network element 110E allocates the label L:E,F for the prefix F to be used by the network element 110A when sending traffic destined for the prefix F on the LSP segment 160 between the network element 110A and the network element 110E. The network element 110A allocates the label L:A,F for the prefix F which is to be used by the network element 110G destined for the prefix F.

The network element 110B also allocates the label L:B,A for the prefix A (on the network element 110A) and is used by the network element 110C when sending traffic destined for the prefix A on the LSP segment 150 between the network element 110C and 110B. The network element 110A also allocates the label L:A,A for the prefix A that is to be used by the network element 110B when sending traffic destined for the prefix A on the LSP segment 151 between the network element 110A and 110B.

By way of example, during normal operation (assuming that there is not failure that affects the path of the traffic), traffic flowing from the network element 110D to the prefix F on the network element 110F takes the following path of the LSP 160: the network element 110D to the network element 110B (on the LSP segment 141 with the label L:B,F), the network element 110B to the network element 110C (on the LSP segment 142 with the label L:C,F), and the network element 110C to the network element 110F (on the LSP segment 143 with the label L:F,F). As another example, traffic flowing from the network element 110C to the prefix A on the network element 110A takes the following path of the LSP 165: network element 110C to the network element 110B (on the LSP segment 150 with the label L:B,A), and the network element 110B to the network element 110A (on the segment 151 with the label L:A,A).

The network elements include forwarding structures (e.g., Incoming Label Map (ILM), Next Hop Label Forwarding Entry (NHLFE), Forwarding Equivalence Class (FEC) to NHLFE Map (FTN), etc.) to perform the label switching. These forwarding structures are, at least part of, the dataplane state of the network elements. For example, the network element 110B includes forwarding structure(s) that specify that when it receives a packet having the label L:B,F from the network element 110D, it is to swap that label with the label L:C,F advertised by the network element 110C and transmit the packet to the network element 110C.

In one embodiment, the network elements illustrated in FIG. 1 compute BSP LSPs for a number of potential failures in case that the failures occur. The following terminology is used to describe the operations performed by the network elements to establish the LDP FRR.

1. A directed graph is denoted by G. Nodes are denoted by S, D, N, M, O, and P. Links are denoted by L, K, J, and I.
2. All links in G have cost >0.
3. Node (G, D) denotes a node D in graph G.
4. SPT stands for shortest path tree (as computed by, for example, Dijkstra's algorithm).
5. SPT(G, S) denotes a SPT from node S (in graph G) to all other nodes in G. Note that SPT(G, D) is a directed acyclic graph (DAG) and is of course a graph.
6. PairSP-T(G, S, D) denotes the SPT between a pair of nodes from S to D in G.
7. PairSPT(G, S, D, D1, D2, . . . ) denotes the shortest path from S to reach anyone of D, D1, D2, . . . .
8. ToSPT(G, D) is the shortest path tree to a node D (as computed by, for example, Dijkstra's algorithm) in graph G from all other nodes in G. Note that toSPT(G, D) is also a DAG similar to SPT(G, S), and is of course a graph.
9. Link (G, L) denotes a directed link L in graph G.
10. UpNode(G, L) denotes a node in graph G that is at the upstream end of link L.
11. DnNode(G, L) denotes a node in graph G that is at the downstream end of L.
12. Note that UpNode(toSPT(G, D), L) would be a node that would repair a fault in L by sending traffic on an alternate route. This is typically referred to as the Point of Local Repair (PLR) for repairing a fault in L. Also note that DnNode(toSPT(G, D), L) would be a node that traffic merges back when link protection is done by PLR for the directly connected LDP peer and label stacking is used.
13. Upstr(G, D, L) denotes a subtree of a G that consists of all nodes that are upstream of L in toSPT(G, D) and all links between those nodes. If L does not belong to toSPT (G, D) then it is a NULL graph. Note that upstr is a graph, but not necessarily a DAG.
14. G-L denotes the graph G without link L.
15. G-F denotes a subset of graph G. Here F is a set of links and nodes (with their attached links) from G. F is removed from G to give G-F.

In a connected graph G, for any link L in the toSPT(G, D), (for any D), there exists a node in upstr(G, D, L) with a link other than L to a node in G but not in upstr(G, D, L) if there exists a path from UpNode(L) to D in G-L. If there does not exist such a node, then the link L is a cut-edge of the graph G and there is no path from UpNode(G, L) to D in G-L. If L is not a cut-edge, then there is a path from UpNode (G,L) to DnNode (G,L) that does not contain L. Assuming that there is not a path from one SPT subtree to another, a link does not exist between the two subtrees and there is not a common node between the two subtrees. In this case, there is no connectivity between the two trees and the failure has created two disjoint subgraphs, and there is no alternative path.

Figure 2:
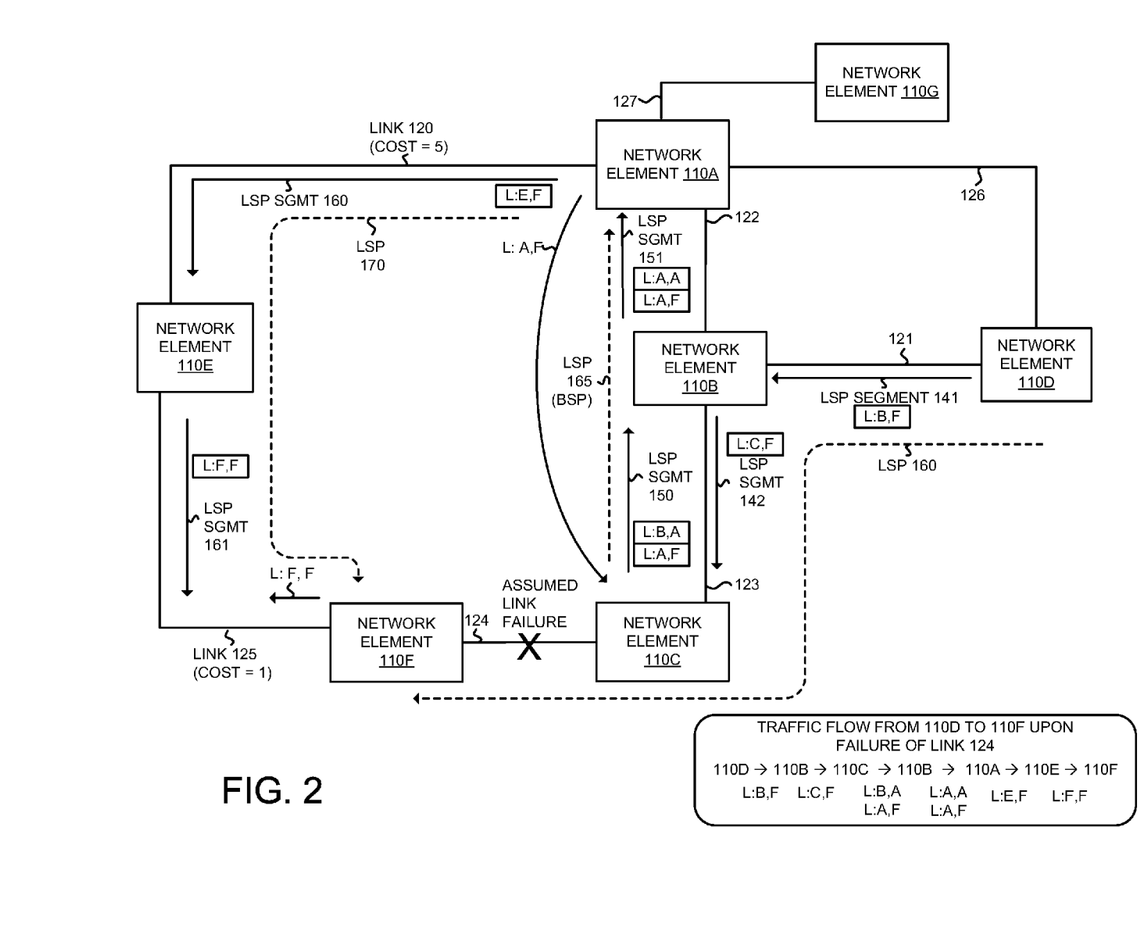
FIG. 2 illustrates the network of FIG. 1 where the network elements configure a BSP LSP to reach a given destination assuming a potential failure of a link according to one embodiment.

FIG. 2 illustrates the network of FIG. 1 where the network elements configure a BSP LSP to reach a prefix F connected to the network element 110F over a potential failure of the link 124. Assuming a failure of the link 124, the network element 110C acts as the PLR and the network element 110A acts as the BSP-MP.

The network element 110C uses label stacking to switch traffic from the LSP 160 (which is an already existing shortest path LSP) to the LSP 165, which is the shortest path LSP from the PLR to the network element 110A (the BSP-MP) and is used as the backup shortest path (BSP) LSP. For example, the network element 110C stacks the label to reach the network element 110A on the label that the network element 110A uses for the SP-LSP that does not go through the failure. Thus, the network element 110C reuses the existing LSP 165 to reroute traffic around the failure of the link 124. The network element 110A (the BSP-MP) label switches traffic from the LSP 165 (the BSP LSP) to the LSP 160 (the SP LSP that does not go through the failure) thus restoring the traffic. Since all the nodes along the path between the PLR to the BSP-MP have state for the BSP LSP (the LSP 160), additional state is not required along the path from the PLR to the BSP-MP. However, the PLR maintains extra state (e.g., the label that the BSP-MP uses to send the packet back on the SP-LSP). The shortest-path LSP may be used as a BSP LSP for many prefixes (e.g., a label specific to the prefix is swapped prior to pushing the label of the shortest-path LSP onto the label stack).

Thus, the network element 110C uses the shortest-path LSP (the LSP 165) to the network element 110A as the backup shortest path LSP for protecting the LSP to a prefix F at the network element 110F from a failure of the link 124. The network element 110C pre-installs a failure action for the link 124 (e.g., in entries of its ILM) such that it will first swap the label L:C,F to L:A,F and then push the label for the shortest-path LSP to the network element 110A (the label L:B,A). The network element 110B includes a forwarding entry such that upon receiving a packet with an outer label of L:B,A, that packet will be label switched to the label L:A,A and sent on the LSP segment 151 to the network element 110A. The network element 110A includes forwarding entries that causes a packet received with an outer label of L:A,A and an inner label of L:A,F to be label switched onto the LSP segment 160 with the label L:E,F. The network element 110E includes a forwarding entry that causes a packet received with the label L:E,F to be label switched onto the LSP segment 161 with the label L:F,F.

By way of example, when there is a failure of the link 124, traffic flowing from the network element 110D to the network element 110F for the prefix F takes the following path: the network element 110D to the network element 110B (on the LSP segment 141 using the label L:B,F), the network element 110B to the network element 110C (on the LSP segment 142 with a swap of the label L:B,F for the label L:C,F), the network element 110C to the network element 110B (on the LSP segment 150 with a swap of the label L:C,F for the label L:A,F and a push of the label L:B,A), the network element 110B to the network element 110A (on the LSP segment 152 with a swap of the label L:B,A for the label L:A,A (the label L:A,F remains on the label stack)), the network element 110A to the network element 110E (on the LSP segment 160 with a swap of the label L:A,F for the label L:E,F), the network element 110E to the network element 110F (on the LSP segment 161 with a swap of the label L:E,F for the label L:F,F).

It should be understood that although FIG. 2 illustrates the network element 110A receiving a label stack of the label L:A,A on the label L:A,F after a failure of the link 124, the label of the backup shortest path LSP 165 (the label L:A,A) may already be popped when the packet is received at the network element 110A in situations where penultimate hop-popping (PHP) is used.

Figure 4:
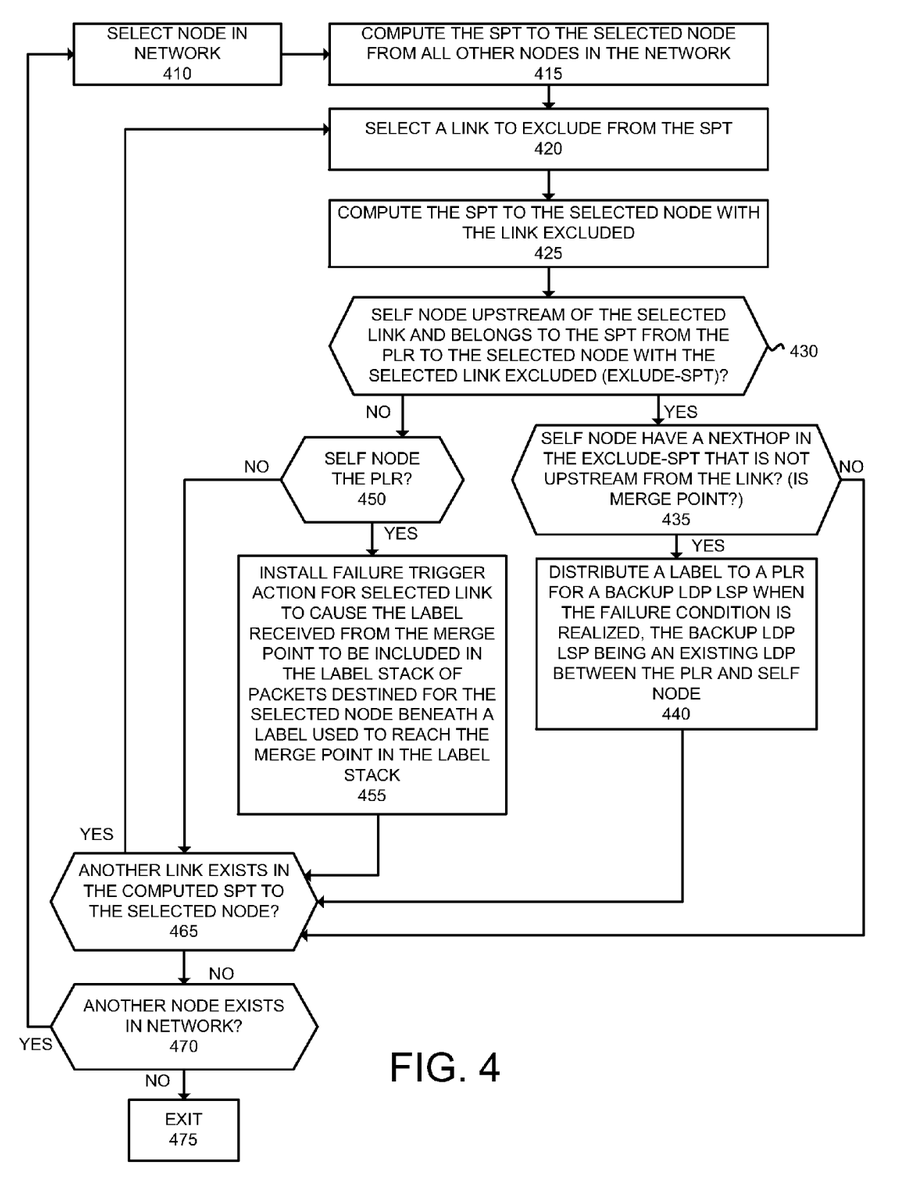
FIG. 4 is a flow diagram illustrating exemplary operations for configuring LDP-FRR with shortest path LSP reuse for a single link failure according to one embodiment.

FIG. 2 will further be described with respect to the FIG. 4, which is a flow diagram illustrating exemplary operations for configuring LDP FRR with reuse of SP LSPs according to one embodiment. In one embodiment, each of the network elements 110A-F performs the operations described in FIG. 4, for potentially multiple failure conditions in the network.

At operation 410, one of the nodes (one of the network elements 110A-F) is selected. For purposes of this example, with respect to FIG. 2, the selected node is the network element 110F. Flow then moves to operation 415 and an SPT is computed to the selected node 110F from all other nodes in the network. For example, the SPT path from the network element 110D to the network element 110F is the network element 110D to the network element 110B to the network element 110C to the network element 110F. The SPT path from the network element 110A to the network element 110F is the network element 110A to the network element 110B to the network element 110C to the network element 110F. The SPT path from the network element 110E is the network element 110E to the network element 110F. The links 120 and 126 are not part of the SPT to the network element 110F. Flow then moves to operation 420.

At operation 420, a link is selected to exclude from the computed SPT. For purposes of this example, with respect to FIG. 2, the selected link to exclude is the link 124 between the network element 110F and 110C (thus the link 124 is assumed to fail). Flow then moves to operation 425 and the SPT to the selected node is computed with the selected link excluded. Thus, the SPT is calculated to the selected node assuming that the selected link is not part of the network topology. For example, the SPT path from the network element 110C to the network element 110F (assuming that the link 124 does not exist) is the network element 110C to the network element 110B to the network element 110A to the network element 110E to the network element 110F.

Flow then moves to operation 430 where a determination is made whether the network element performing the calculation is upstream of the selected link and belongs to the SPT from the PLR to the selected node with the selected link excluded. The SPT from the PLR to the selected node with the selected link is referred herein with respect to the operations of FIG. 4 as the exclude-SPT. With reference to FIG. 2, assuming a failure of the link 124 for traffic sent from the network element 110D to the network element 110F, the PLR is the network element 110C. The nodes upstream of the selected link 124 include the network elements 110A, 110B, 100C, 110D and 110G. The nodes that belong to the exclude-SPT are the network elements 110A, 110B, and 110G (network element 110D is not part of the exclude-SPT). If the network element performing the calculation is upstream of the selected link and belongs to the SPT from the PLR to the second node with the selected link excluded, then flow moves to operation 435; otherwise flow moves to operation 450.

At operation 435, the network element performing the calculation determines whether it has a nexthop in the exclude-SPT that is not upstream from the link. In other words, at operation 435, the network element determines whether it is the merge point (the BSP-MP). To say it another way, if the network element is on the exclude-SPT and belongs on the shortest path LDP LSP to the selected node that does not traverse the failure point, then it is a merge point and flow would move to operation 440. For example, with reference to FIG. 2, the network element 110A, which is on the exclude-SPT and is upstream of the link 124, has a nexthop that is not upstream from the selected link 124 (the network element 110E), and is thus the merge point. The network element 110B, although on the exclude-SPT, does not have a nexthop that is not upstream from the selected link 124. If it is the merge point, then flow moves to operation 440, otherwise flow moves to operation 465.

At operation 440, the network element distributes a label to the PLR for a backup LDP LSP when the failure condition is realized. The backup LSP is an existing LSP between the PLR and the network element. For example, with reference to FIG. 2, the network element 110A distributes the label L:A,F to the network element 110C. The label L:A,F is the label used by the network element 110A when merging the traffic onto the LSP segment 160 to redirect the traffic on the SPT LSP 170 to the network element 110F. The network element 110A may establish a targeted LDP session with the network element 110C to distribute the label L:A,F, or may advertise the label to the network element 110B which in turn advertises the label to the network element 110C. Flow moves from operation 440 to operation 465.

At operation 450, if the network element that is performing the operations is the PLR, then flow moves to operation 455, otherwise flow moves to operation 465. At operation 455, the network element installs a failure trigger action for the selected link (the excluded link) to cause the label received from the merge point to be included in the label stack of packets destined for the selected node beneath a label used to reach the merge point. For example, with respect to FIG. 2, the network element 110C installs a failure trigger action such that after the link 124 failing, the network element 110C causes traffic arriving with the label L:C,F to be sent on the LSP segment 150 and labeled with the label L:A,F (allocated by the network element 110A) and the label L:B,A (allocated by the network element 110B). Thus, forwarding entries (e.g., entries in the ILM) of the network element 110C (which is acting as the PLR for a failure of the link 124) are changed such that upon a failure of the link 124, traffic is switched from the shortest path LSP 160 to the backup shortest path LSP 165.

At operation 465, it is determined whether another link exists in the computed SPT to the selected node. If another link exists, then flow moves back to operation 420 and another link is selected to be excluded from the computed SPT. If another link does not exist, then flow moves to operation 470 where it is determined whether another node exists in the network. If there is another node, then flow moves back to operation 410 where another node is selected. If another node does not exist, then flow moves to operation 475 and the process exits.

Figure 3:
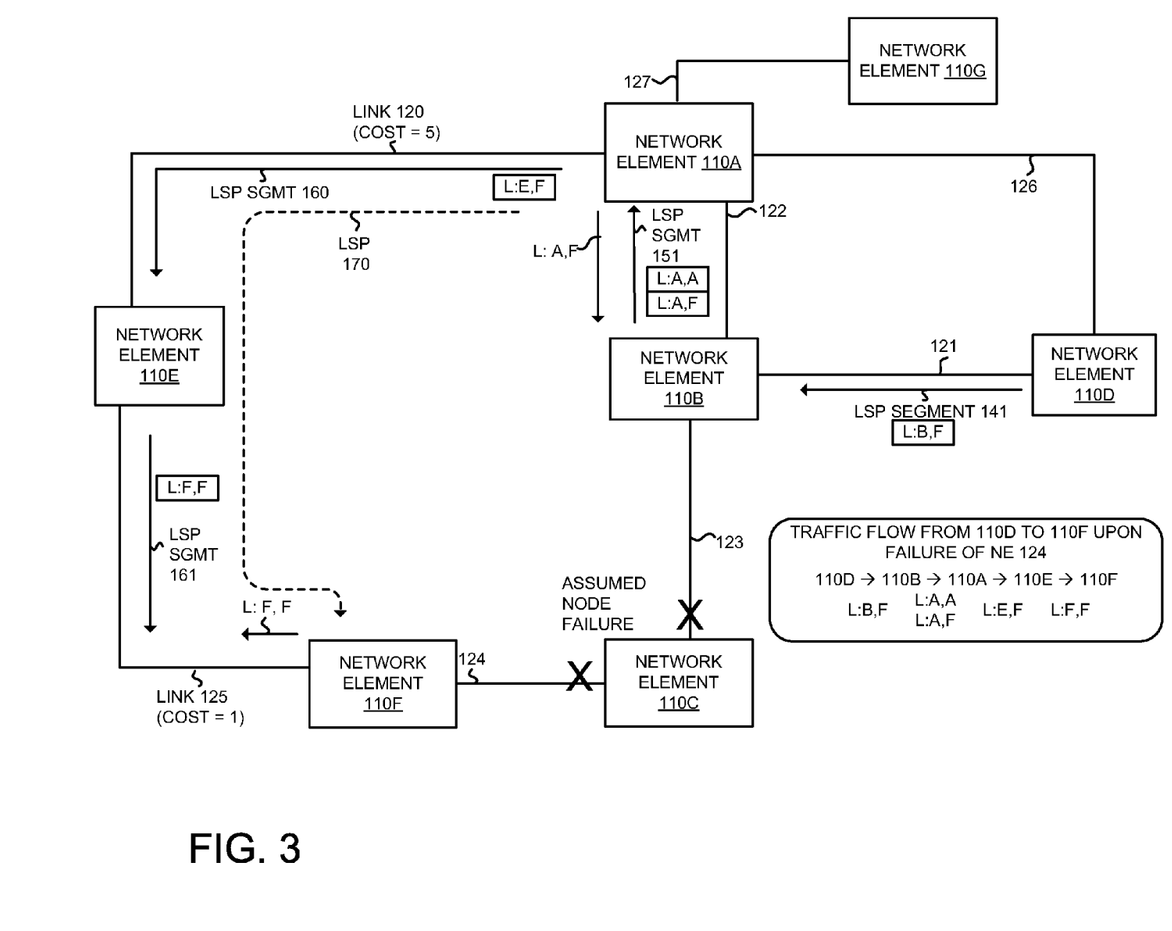
FIG. 3 illustrates the network of FIG. 1 where the network elements configure a BSP LSP to reach a given destination assuming a potential failure of a network element according to one embodiment.

FIG. 3 illustrates the network of FIG. 1 where the network elements configure LDP FRR with reuse of SP LSPs over a potential failure of the network element 110C. FIG. 3 will be described with respect to FIG. 5, which is a flow diagram that illustrates exemplary operations for configuring LDP FRR with reuse of SP LSPs over a potential failure of a network element according to one embodiment. In one embodiment, each of the network elements 110A-G perform the operations described in FIG. 5.

Figure 5:
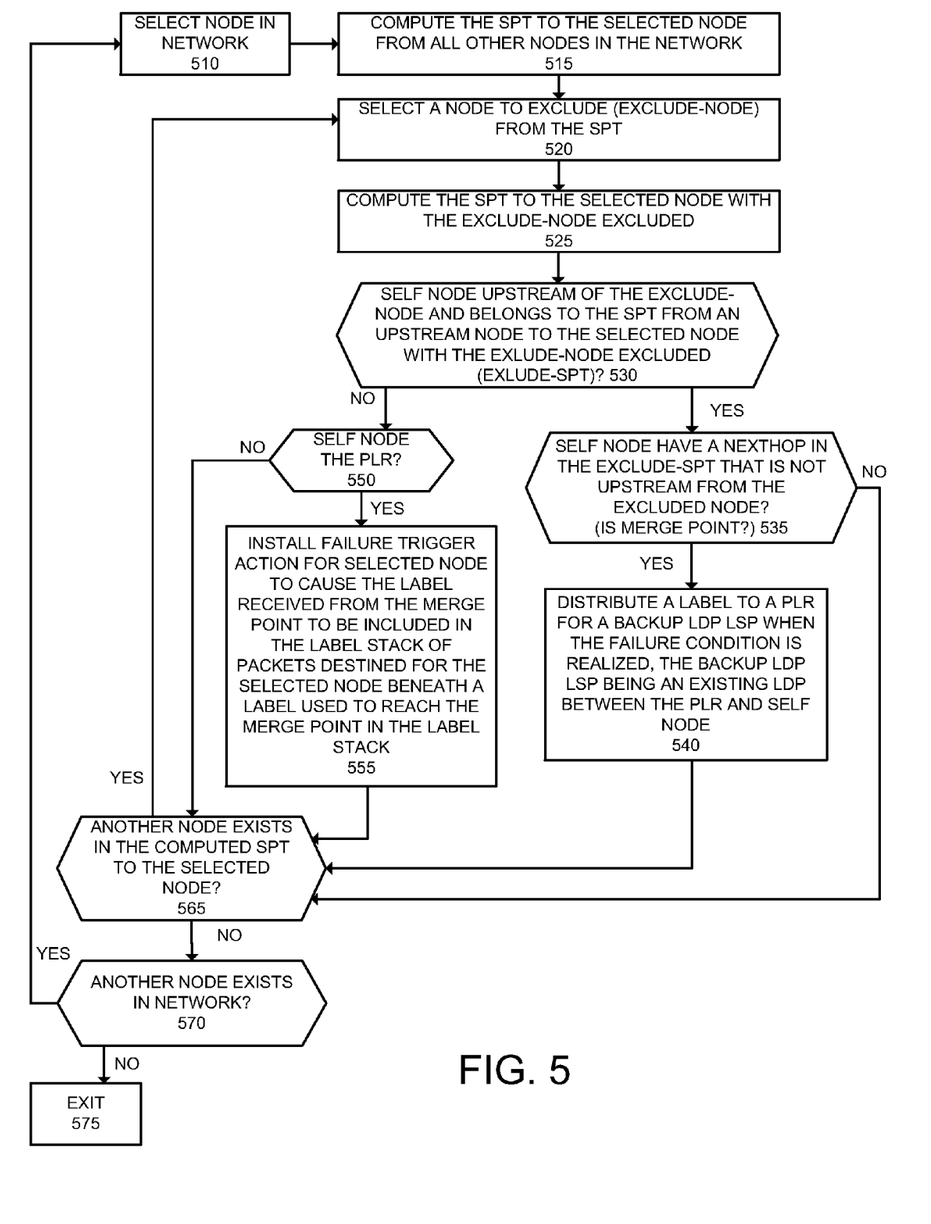
FIG. 5 is a flow diagram illustrating exemplary operations for configuring LDP-FRR with shortest path LSP reuse for a single node failure according to one embodiment.

At operation 510, one of the nodes (one of the network elements 110A-G) is selected. With respect to FIG. 3, the selected node is the network element 110F. Flow then moves to operation 515 and a SPT is computed to the selected node 110F from all other nodes in the network. For example, the SPT path from the network element 110D to the network element 110F is the network element 110D to the network element 110B to the network element 110C to the network element 110F. The SPT path from the network element 110A to the network element 110F is the network element 110A to the network element 110B to the network element 110C to the network element 110F. The SPT path from the network element 110E is the network element 110E to the network element 110F. The links 120 and 126 are not part of the SPT to the network element 110F. Flow then moves to operation 520.

At operation 520, a node is selected to exclude from the computed SPT. With respect to FIG. 3, the selected node to exclude is the network element 110C, which is referred herein as the exclude-node (thus the network element 110C is assumed to fail). Flow then moves to operation 525 and the SPT to the selected node is computed with the exclude-node excluded. Thus, the SPT is calculated to the selected node assuming that the exclude-node is not part of the network. For example, the SPT path from the network element 110D to the network element 110F (assuming that the network element 110C does not exist) is the network element 110D to the network element 110B to the network element 110A to the network element 110E to the network element 110F.

Flow then moves to operation 530 where a determination is made whether the network element performing the calculation is upstream of the exclude-node and belongs to the SPT from an upstream node to the selected node with the exclude-node excluded. The SPT from an upstream node to the selected node with the exclude-node excluded is referred herein with respect to the operations of FIG. 5 as the exclude-SPT. With reference to FIG. 3, assuming a failure of the network element 110C for traffic sent from the network element 110D for the prefix F at the network element 110F, the PLR is the network element 110B. The nodes upstream of the failure include the network elements 110A, 110B, 110D and 110G. The nodes that belong to the exclude-SPT are the network elements 110A and 110G (network element 110D is not part of the exclude-SPT). If the network element performing the calculation is such a node, then flow moves to operation 535; otherwise flow moves to operation 550.

At operation 535, the network element performing the calculation determines whether it has a nexthop in the exclude-SPT that is not upstream from the excluded node. In other words, at operation 535, the network element determines whether it is the merge point (the BSP-MP). To say it another way, if the network element is on the exclude-SPT and belongs on the shortest path LDP LSP to the selected node that does not traverse the failure point, then it is a merge point and flow would move to operation 540. For example, with reference to FIG. 3, the network element 110A, which is on the exclude-SPT and is upstream of the network element 110C, has a nexthop that is not upstream from the network element 110C (which is the network element 110E) and is thus the merge point. If this node is the merge point, then flow moves to operation 540, otherwise flow moves to operation 565.

At operation 540, the network element distributes a label to the PLR for a backup LDP LSP when the failure condition is realized. The backup LSP is an existing LSP between the PLR and the network element. For example, with reference to FIG. 3, the network element 110A distributes the label L:A,F to the network element 110B. The label L:A,F is the label used by the network element 110A when merging the traffic onto the LSP segment 160 to redirect the traffic on the SPT LSP 170 to the network element 110F. Flow moves from operation 540 to operation 565.

At operation 550, if the network element that is performing the operations is the PLR, then flow moves to operation 555, otherwise flow moves to operation 565. At operation 555, the network element installs a failure trigger action for the excluded node to cause the label received from the merge point to be included in the label stack of packets destined for the prefix beneath a label used to reach the merge point. For example, with respect to FIG. 3, the network element 110B installs a failure trigger action such that after the network element 110C failing, the network element 110B causes traffic arriving with the label L:B,F to be sent on the LSP segment 151 and labeled with the label L:A,F (allocated by the network element 110A) and the label L:A,A (allocated by the network element 110A). Thus, forwarding entries (e.g., entries in the ILM) of the network element 110B (which is acting as the PLR for a failure of the network element 110C) are changed such that upon a failure of the network element 110C, traffic to the prefix F received on the LSP segment 141 is switched to the LSP segment 151 (which is acting as the backup shortest path LSP).

At operation 565, it is determined whether another node exists in the computed SPT to the selected destination node. If another node exists, then flow moves back to operation 520 and another node is selected to be excluded from the computed SPT. If another node does not exist, then flow moves to operation 570 where it is determined whether another destination node exists in the network. If there is another node, then flow moves back to operation 510 where another node is selected for the destination. If there is not another node, then flow moves to operation 575 and the process exits.

In the examples illustrated in FIGS. 2 and 3, the shortest path LSP between the PLR and the BSP-MP is not affected at the same time as the failure at the PLR. In other words, there is not a Shared Risk Link Group (SRLG) that contains both the failure entity at the PLR and another entity along the shortest path from the PLR to the BSP-MP. In one embodiment, where there is not a shortest path LSP available between the PLR to the BSP-MP, a recursive technique may be applied to generate the backup SP path. As a result of the recursive application is that the label stack increases by one each time the backup-SP path deviates from the shortest path.

In one embodiment, if there is not a shortest path LSP available between the PLR to the BSP-MP, starting from the BSP-MP, the first node along the backup SP LSP path that differs from the SP LSP (referred herein as a stitching node) advertises a separate label for the BSP LSP (referred herein as an alternative label since the LSP will not be taken unless the failure occurs) upstream hop-by-hop towards the PLR. The stitching node installs a label-swap operation to send packets from the non shortest path LSP (from the first-node to the PLR) to the shortest path LSP (from the stitching node to the BSP-MP). Note that the path along the backup-SP LSP from the stitching node to the BSP-MP follows the shortest path LSP and uses the same data-plane state. This ensures that there is no additional stacking required. However, data-plane state is required from the stitching node to the PLR.

Figure 6:
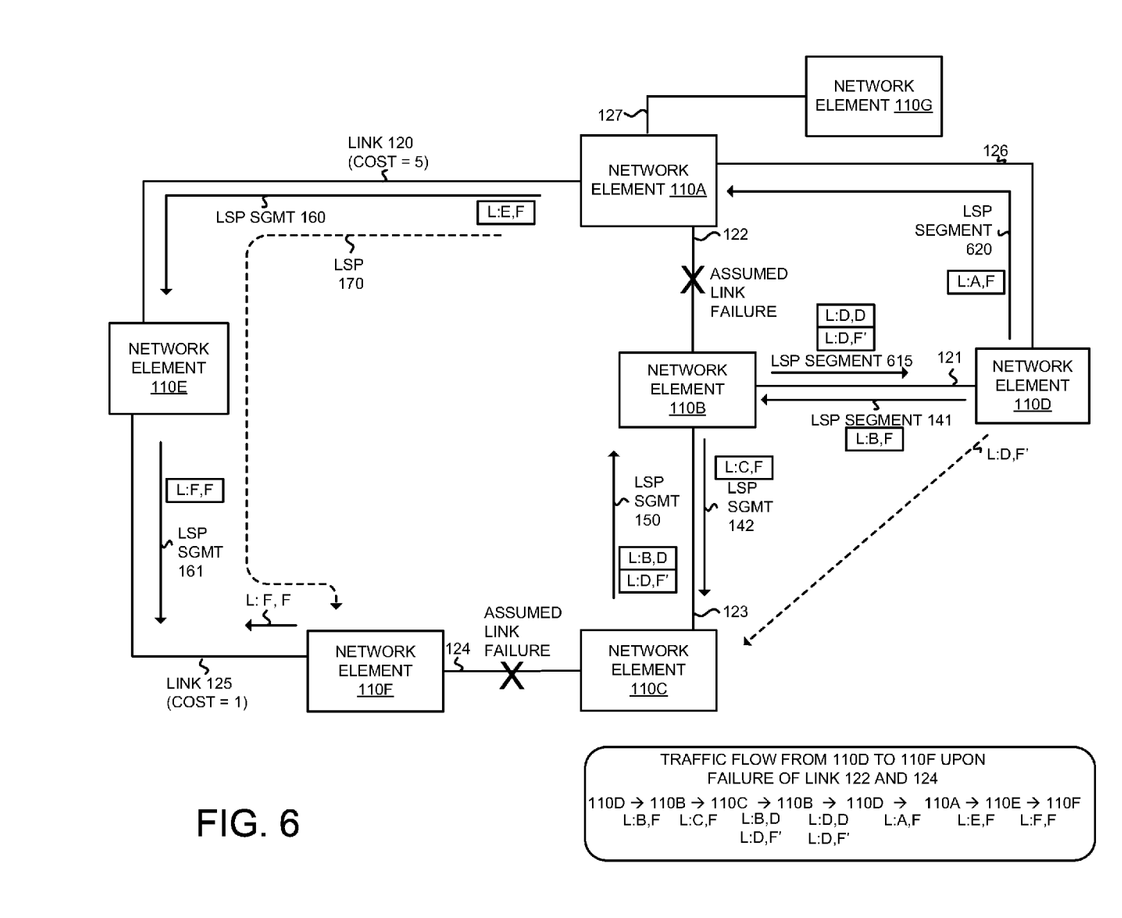
FIG. 6 illustrates the network of FIG. 1 where the network elements configure a BSP LSP to reach a given destination when there are multiple failures according to one embodiment.

FIG. 6 illustrates the network of FIG. 1 where the network elements configure a BSP LSP to reach a prefix F connected to the network element 110F when there is a failure of the links 122 and the link 124 (e.g., the links 122 and 124 are part of a SRLG). Similar to FIG. 2, the merge point (BSP-MP) is the network element 110A and the PLR is the network element 110C (assuming a failure of the links 122 and 124 for traffic destined for the prefix F). The network element 110D is the stitching node.

Since there is not a shortest path LSP from the PLR (the network element 110C) to the BSP-MP (the network element 110A) that does not traverse the failure (because of the link 122 which would be part of the shortest path LSP), the network element 110D advertises an alternative label L:D,F' for the prefix F to the network element 110C. For traffic directed to the prefix F (assuming this failure), the network element 110C uses label stacking to switch traffic from the LSP segment 142 (from the network element 110B) back to the network element 110B via the LSP segment 150, which is a segment of the shortest path LSP from the PLR to the network element 110A (the BSP-MP) and is used as a segment of the backup shortest path LSP. The network element 110C stacks the label to reach the network element 110D on the label that the network element 110D uses for the backup SP-LSP that does not go through the failure. The network element 110B label switches traffic from the LSP segment 150 to the backup LSP segment 615. The network element 110D (the stitching node) label switches traffic from the LSP segment 615 (which is part of the BSP LSP) to the LSP segment 620 (which is part of the BSP LSP). The network element 110A (the BSP-MP) label switches traffic from the LSP segment 620 to the LSP segment 160 (the SP LSP that does not go through the failure) thus restoring the traffic.

The network element 110C pre-installs a failure action for the failure of the links 122 and 124 (e.g., in entries of its ILM) such that it will first swap the label L:C,F to L:D,F' and then push the label for the shortest-path LSP to the network element 110D (the label L:B,D). The network element 110B includes data-plane state such that upon receiving a packet with an outer label of L:B,D, the label will be switched to the label L:D,D and sent on the LSP segment 615 to the network element 110D. The network element 110D includes data plane state such that upon receiving a packet with an outer label of L:D,D and an inner label of L:D,F', the network element 110D switches the packet onto the LSP segment 620 with the label L:A,F. The network element 110A includes data plane state that causes a packet received with a label of L:A,F to be switched onto the LSP segment 160 with the label L:E,F. The network element 110E includes data plane state that causes a packet received with the label L:E,F to be label switched onto the LSP segment 161 with the label L:F,F.

By way of example, when there is a failure of the links 122 and 124, traffic flowing from the network element 110D to the network element 110F for the prefix F takes the following path: the network element 110D to the network element 110B (on the LSP segment 141 using the label L:B,F), the network element 110B to the network element 110C (on the LSP segment 142 with a swap of the label L:B,F for the label L:C,F), the network element 110C to the network element 110B (on the LSP segment 150 with a swap of the label L:C,F for the label L:D,F' and a push of the label L:B,D), the network element 110B to the network element 110D (on the LSP segment 615 with a swap of the label L:B,D for the label L:D,D (the label L:D,F' remains on the label stack)), the network element 110D to the network element 110A (on the LSP segment 620 with a swap of the label L:D,F' for the label L:A,F), the network element 110A to the network element 110E (on the LSP segment 160 with a swap of the label L:A,F for the label L:E,F), and the network element 110E to the network element 110F (on the LSP segment 161 with a swap of the label L:E,F for the label L:F,F).

It should be understood that although FIG. 2 illustrates the network element 110D receiving a label stack of the label L:D,D on the label L:D,F', the label to reach the network element 110D (the label L:D,D) may already be popped when the packet is received at the network element 110D in situations where penultimate hop-popping (PHP) is used.

Figure 7:
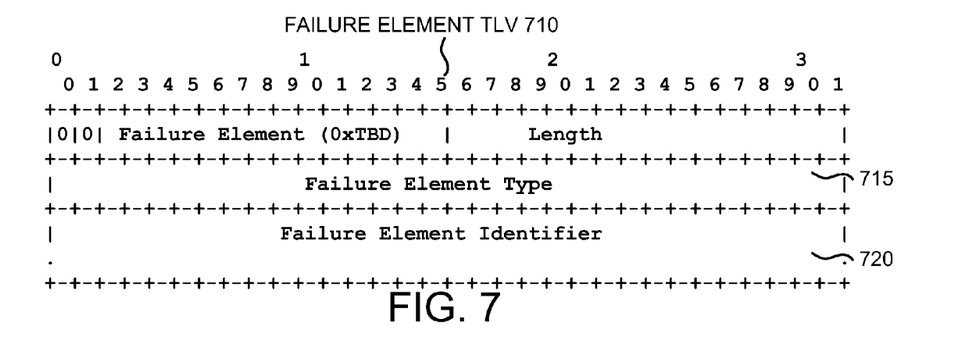
FIG. 7 illustrates an exemplary Failure Element TLV that may be used in embodiments.

In one embodiment, signaling extensions are defined to establish the LDP FRR. For example, a Failure Element Type, Length, Value (TLV) identifies the failure that the BSP LSP is protecting against. It identifies that this message if for a BSP LSP. FIG. 7 illustrates an exemplary Failure Element TLV 710 according to one embodiment. The Failure Element Type field 715 indicates whether it is a link failure, node failure, or a SRLG failure. The Failure Element Identifier field 720 indicates an identifier of the failure. A link is identified by an IP address of one of its ends. A node is identified by its loopback IP address. The SRLG is identified as defined in RFC 4202.

Figure 8:
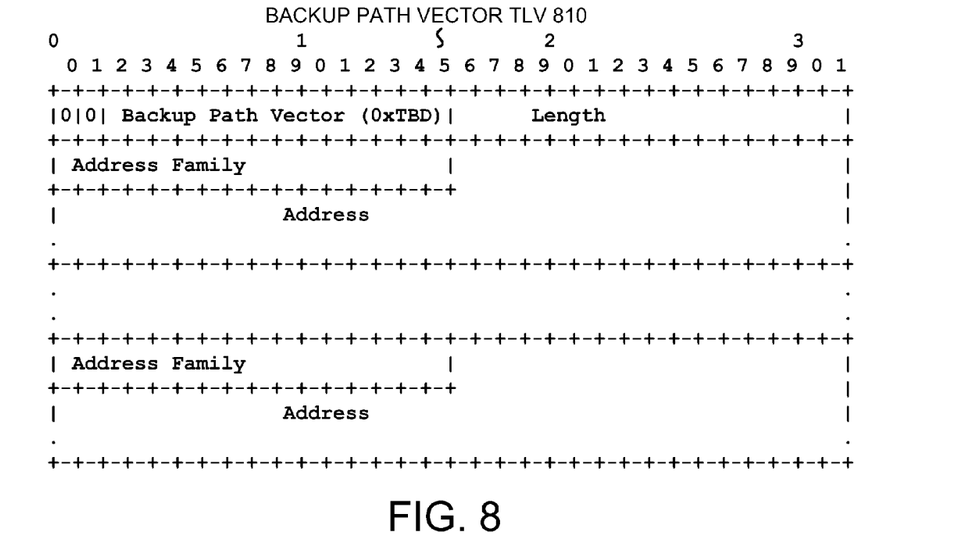
FIG. 8 illustrates an exemplary Backup Path Vector TLV that may be used in embodiments.

A Backup Path Vector TLV indicates the path taken by the BSP LSP from the BSP-MP to the PLR. It includes the loopback addresses of each LSR along the path. The first address is the BSP-MP and the last address is the address of the PLR. FIG. 8 illustrates an exemplary Backup Path Vector TLV 810 according to one embodiment.

Figure 9:
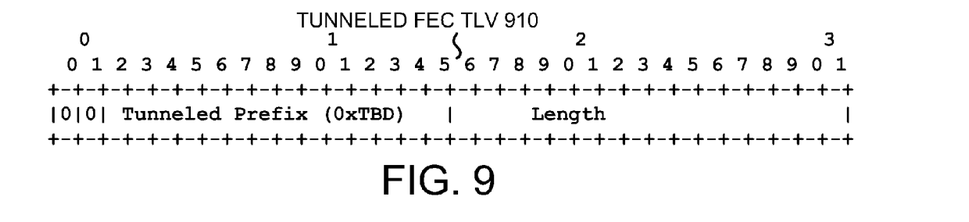
FIG. 9 illustrates an exemplary Tunneled FEC TLV that may be used in embodiments.

A Tunneled Forwarding Equivalence Class (FEC) TLV indicates to the PLR the label advertised by the BSP-MP for the FEC for re-routing traffic. This label should be used to tunnel through the BSP LSP. The intermediate nodes do not install any data-plane state for a tunneled FEC. FIG. 9 illustrates an exemplary Backup Path Vector TLV 910 according to one embodiment.

By way of example, an LSR computes the failures and prefixes for which it can act as a BSP-MP and advertises a label mapping for the BSP LSP by including the Failure Element TLV and the Backup Path Vector TLV. If label stacking is used (e.g., if there is an existing shortest path LSP from the PLR to the BSP-MP that does not traverse the failure), the BSP-MP advertises label mappings for the tunneled prefixes by including the Tunneled Prefix TLV in addition to the Failure Element TLV and the Backup Path Vector TLV. If label stacking is used and there is an existing shortest path LSP from the PLR to the BSP-MP that does not traverse the failure, the intermediate LSRs do not allocate labels since the label is tunneled in a BSP LSP; they do however, forward the label mapping using the Backup Path Vector TLV. The PLR installs actions for a failure trigger using the labels.

Figure 10:
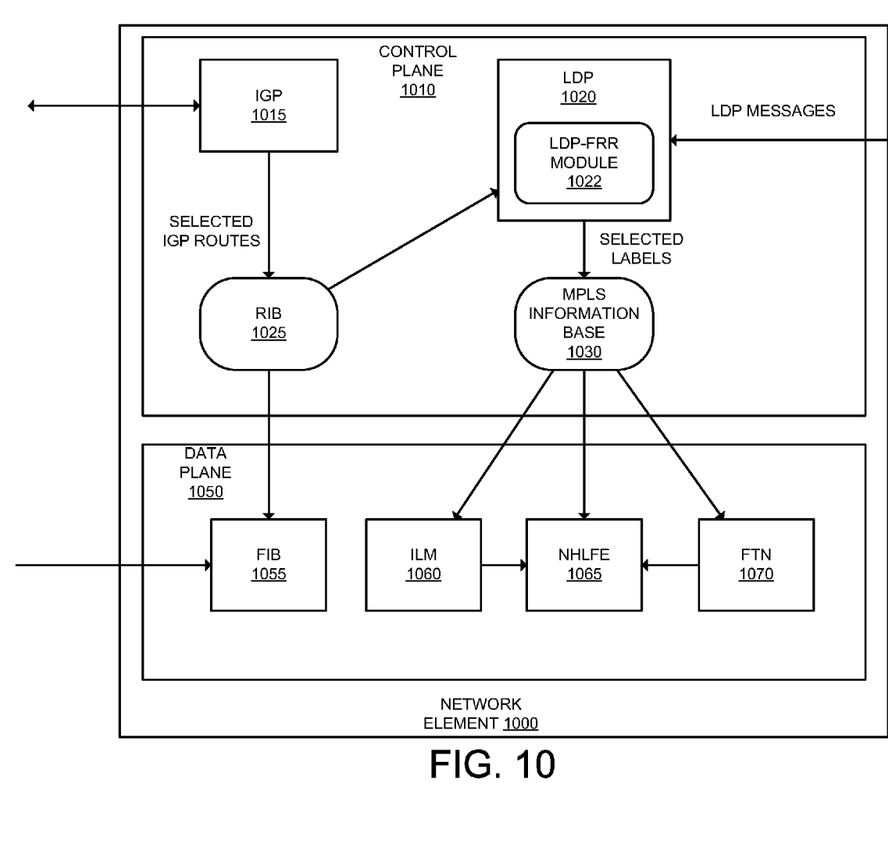
FIG. 10 illustrates an exemplary network element that implements LDP FRR according to one embodiment.

FIG. 10 illustrates an exemplary network element that implements LDP FRR according to one embodiment. The network element 1000 includes the control plane 1010 and the data plane 1050 (sometimes referred to as a forwarding plane or a media plane). The control plane 1010 determines how data (e.g., packets) is routed (e.g., the next-hop for the data and the outgoing port for the data) and the data plane 1050 is in charge of forwarding that data. The control plane 1010 includes the IGP (Interior Gateway Protocol) module 1015 and the LDP (Label Distribution Protocol) Module 1020. The IGP module 1015 may be running a link-state protocol such as OSPF (Open Shortest Path First) or IS-IS (Intermediate System to Intermediate System), or running another protocol such as RIP (Routing Information Protocol). The IGP module 1015 communicates with other network elements to exchange routes and select those routes based on one or more routing metrics. The IGP routes that are selected are stored in the RIB (Routing Information Base) 1025. The IGP module 1015 can also cause the route entries which are not selected and stored in the RIB 1025 to be stored in a local RIB (e.g., an IGP local RIB).

The LDP module 1020 exchanges label mapping information with its peers (LDP peers). For example, the LDP module 1020 may generate label mapping messages and receive label mapping messages from its peers. The LDP module 1020 relies on the underlying routing information provided by the IGP module 1015 to the RIB 1025 in order to forward label packets. The LDP module 1020 allocates labels and stores other information related to forwarding label packets (e.g., NHLFE information, ILM (Incoming Label Map) information, FTN information) in the MPLS information base 1030. The LDP module 1020 includes the LDP-FRR module 1022 which extends the functionality of the LDP module 1020 to support the LDP-FRR process described herein.

The control plane 1010 programs the data plane 1050 with route information based on the RIB 1025 and the MPLS information base 1030. Specifically, certain information from the RIB 1025 is programmed to the FIB (Forwarding Information Base) 1055 and certain information from the MPLS information base 1030 is programmed to the ILM structure 1060, the NHLFE structure 1065, and the FTN structure 1070. For example, the labels, failure actions, etc., are programmed to one or more of the ILM structure 1060 and the NHLFE structure 1065 of the data plane 1050 as appropriate such that if the failure occurs, the traffic can be re-routed according to the BSP LSPs quickly (e.g., at line rate).

In one embodiment the network element 1000 includes a set of one or more line cards (sometimes referred to as forwarding cards) and a set of one or more control cards. The set of line cards and control cards are coupled together through one or more mechanisms (e.g., a first full mesh coupling the line cards and a second full mesh coupling all of the cards). The set of line cards typically make up the data plane and may each store the FIB 1055, the ILM 1060, the NHLFE 1065, and the FTN 1070 which will be used when forwarding packets. Specifically, the FTN 1070 is used for forwarding packets that are unlabeled (e.g., they are received from outside the MPLS domain at the ingress LSR) but are to be labeled before forwarding. The ILM 1060 is used for forwarding labeled packets. The control cards typically run the routing protocols including the IGP module 1015, the LDP module 1020, and store the RIB 1025 and the MPLS information base 1030.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first network element for Multiprotocol Label Switching (MPLS) fast re-route using Label Distribution Protocol (LDP), wherein the first network element is one of a plurality of network elements in an MPLS network, the method comprising the steps of:
   receiving a first label advertised from a second network element in the MPLS network;
   computing a shortest path tree (SPT) to reach a destination network element under a selected failure condition that may potentially occur on the MPLS network, wherein the second network element is a nexthop of the first network element in the computed SPT and is not upstream from the selected failure condition in the computed SPT;
   determining that a third one of the plurality of network elements is a Point of Local Repair (PLR) when the selected failure condition is realized;
   distributing a second label to the third network element for a backup LDP label switched path (LSP) that will serve as a backup path when the selected failure condition is realized; and
   installing a swap action from the second label to the first label.

2. The method of claim 1, further comprising the steps of:
   receiving a packet that includes the second label;
   swapping the second label with the first label; and
   transmitting the packet to the second network element with the first label.

3. The method of claim 1, wherein the selected failure condition is a failure of one of a link downstream from the first network element and a network element downstream from the first network element.

4. The method of claim 1, wherein the first network element is a backup shortest path merge point.

5. The method of claim 1, wherein the second network element is a first hop from the first network element on a current shortest path LSP that traverses the selected failure condition.

6. The method of claim 1, wherein the first label advertised from the second network element is used by the first network element when transmitting packets to the second network element irrespective of the prospective failure condition.

7. A method in a first network element for MPLS (Multiprotocol Label Switching) fast re-route using Label Distribution Protocol (LDP), wherein the first network element is one of a plurality of network elements in an MPLS network, the method comprising the steps of:
   computing a shortest path tree (SPT) to reach a destination network element under a selected failure condition that may potentially occur on the MPLS network;
   configuring forwarding state of the first network element such that when the selected failure condition is realized, packets that are subsequently received at the first network element that are destined to the destination network element are re-routed towards a second network element using an existing Label Switched Path (LSP) and include an indication to the second network element to merge the existing LSP with a shortest path LDP LSP from the second network element to the destination network element, wherein the second network element is an upstream network element on the computed SPT that has a nexthop on the shortest path LDP LSP to the destination network element;
   receiving a label allocated by the second network element for the existing LSP that will serve as a backup when a selected failure condition is realized; and
   wherein configuring the forwarding state of the first network element includes installing a failure trigger action to be used when the selected failure condition is realized to cause the label allocated by the second network element to be included in a label stack of packets destined to that destination network element beneath a label that is used to reach the second network element during non-failure conditions.

8. The method of claim 7, further comprising the steps of:
   detecting a failure condition that corresponds with the selected failure condition;
   responsive to the step of detecting, re-routing packets destined for the destination to the second network element to avoid the failure condition, wherein re-routing the packets includes for each packet:
   pushing the label received from the second network element for the existing LSP that onto a label stack of the packet,
   pushing the label used to reach the second network element onto the label stack of the packet, and
   transmitting the labeled packet towards the second network element.

9. The method of claim 7, wherein the selected failure condition is a failure of one of a link downstream from the first network element and a network element downstream from the first network element.

10. The method of claim 7, wherein the first network element is a Point of Local Repair.

11. A network element that is a first one of a plurality of network elements in an Multiprotocol Label Switching (MPLS) network for participating in MPLS fast reroute using LDP (Label Distribution Protocol), comprising:
    a set of one or more processors; and
    a non-transitory computer readable medium that stores an LDP module in a control plane of the network element, that when executed by the set of processors, cause the set of processors to perform the following:
       receive a first label advertised from a second network element in the MPLS network;
       compute a shortest path tree (SPT) to reach a destination network element under a selected failure condition that may potentially occur on the MPLS network, wherein the second network element is a nexthop of the first network element in the computed SPT and is not upstream from the selected failure condition in the computed SPT;
       determine that a third one of the plurality of network elements is a Point of Local Repair (PLR) when the selected failure condition is realized;
       distribute a second label to the third network element for a backup LDP label switched path (LSP) that will serve as a backup path when the selected failure condition is realized; and
    install a swap action from the second label to the first label in one or more forwarding structures in a data plane of the first network element.

12. The network element of claim 11, further comprising:
    the data plane, which when executed by the set of processors, further cause the set of processors to perform the following:

receive a packet that includes the second label;
swap the second label with the first label using the one or more forwarding structures; and
transmit the packet to the second network element with the first label.

13. The network element of claim 11, wherein the selected failure condition is a failure of one of a link downstream from the first network element and a network element downstream from the first network element.

14. The network element of claim 11, wherein the first network element is a backup shortest path merge point.

15. The network element of claim 11, wherein the second network element is a first hop from the first network element on a current shortest path LSP that traverses the selected failure condition.

16. The network element of claim 11, wherein the first label advertised from the second network element is used by the first network element when transmitting packets to the second network element irrespective of the prospective failure condition.

17. A network element that is a first one of a plurality of network elements in an Multiprotocol Label Switching (MPLS) network for participating in MPLS fast reroute using LDP (Label Distribution Protocol), comprising:
  a set of one or more processors; and
  a non-transitory computer readable medium that stores an LDP module in a control plane of the network element, that when executed by the set of processors, cause the set of processors to perform the following:
    compute a shortest path tree (SPT) to reach a destination network element under a selected failure condition that may potentially occur on the MPLS network;
    configure forwarding state of a data plane of the first network element such that when the selected failure condition is realized, packets that are subsequently received at the first network element that are destined to the destination network element are re-routed towards a second network element using an existing Label Switched Path (LSP) and include an indication to the second network element to merge the existing LSP with a shortest path LDP LSP from the second network element to the destination network element, wherein the second network element is an upstream network element on the computed SPT that has a nexthop on the shortest path LDP LSP to the destination network element;
    to receive a label allocated by the second network element for the existing LSP that will serve as a backup when a selected failure condition is realized; and
    wherein a configuration of the forwarding state of the first network element includes installing a failure trigger action to be used when the selected failure condition is realized to cause the label allocated by the second network element to be included in a label stack of packets destined to that destination network element beneath a label that is used to reach the second network element during non-failure conditions.

18. The network element of claim 17, wherein upon detection of a failure condition that corresponds with the selected failure condition, the data plane of the network element to perform the following:
  push the label received from the second network element for the existing LSP that onto a label stack of the packet,
  push the label used to reach the second network element onto the label stack of the packet, and
  transmit the labeled packet towards the second network element.

19. The network element of claim 17, wherein the selected failure condition is a failure of one of a link downstream from the first network element and a network element downstream from the first network element.

20. The network element of claim 17, wherein the first network element is a Point of Local Repair.

* * * * *

UNITED STATES PATENT AND TRADEMARK OFFICE
CERTIFICATE OF CORRECTION

| | |
|---|---|
| PATENT NO. | : 8,885,461 B2 |
| APPLICATION NO. | : 13/281391 |
| DATED | : November 11, 2014 |
| INVENTOR(S) | : Kini et al. |

It is certified that error appears in the above-identified patent and that said Letters Patent is hereby corrected as shown below:

In the specification

In Column 5, Line 62, delete "PairSP-T" and insert -- PairSPT --, therefor.

Signed and Sealed this
Sixth Day of October, 2015

Michelle K. Lee
*Director of the United States Patent and Trademark Office*